United States Patent
Xu et al.

(10) Patent No.: US 10,224,998 B2
(45) Date of Patent: Mar. 5, 2019

(54) RECEIVE DECORRELATOR FOR A WIRELESS COMMUNICATIONS SYSTEM

(71) Applicant: UNIVERSITY OF KWAZULU-NATAL, Westville (ZA)

(72) Inventors: Hongjun Xu, Durban (ZA); Peter Odero Akuon, Umbilo (ZA)

(73) Assignee: UNIVERSITY OF KWAZULU-NATAL, Westville (ZA)

( * ) Notice: Subject to any disclaimer, the term of this patent is extended or adjusted under 35 U.S.C. 154(b) by 0 days.

(21) Appl. No.: 15/740,361

(22) PCT Filed: Jun. 27, 2016

(86) PCT No.: PCT/IB2016/053818
§ 371 (c)(1),
(2) Date: Dec. 28, 2017

(87) PCT Pub. No.: WO2017/001995
PCT Pub. Date: Jan. 5, 2017

(65) Prior Publication Data
US 2018/0198512 A1    Jul. 12, 2018

(30) Foreign Application Priority Data

Jun. 29, 2015 (GB) .................................. 1511369.9

(51) Int. Cl.
*H04B 7/08*    (2006.01)
(52) U.S. Cl.
CPC ........... *H04B 7/0885* (2013.01); *H04B 7/084* (2013.01); *H04B 7/0848* (2013.01); *H04B 7/0888* (2013.01)
(58) Field of Classification Search
CPC .... H04B 7/084; H04B 7/0848; H04B 7/0885; H04B 7/0888; H04B 7/0857
See application file for complete search history.

(56) References Cited

U.S. PATENT DOCUMENTS 5,524,023 A     6/1996  Tsujimoto
5,692,018 A *  11/1997  Okamoto .......... H04L 25/03057
                                                    375/233

(Continued)

OTHER PUBLICATIONS

International Search Report for PCT/IB2016/053818 dated Sep. 16, 2016.

*Primary Examiner* — Khanh C Tran
(74) *Attorney, Agent, or Firm* — Thomas Horstemeyer, LLP (57) ABSTRACT

This invention relates to decorrelation of signals in order to improve coding gains of wireless communications. To this end a branch signal processor includes a summer to determine a sum of a first branch signal and a second branch signal to produce a sum signal. A conjugate swapper to determine a conjugate swap of the first branch signal and a conjugate swap of the second branch signal to produce two swapped signals, wherein the conjugate swapper takes an imaginary part of the first branch signal to become a real part and a real part of the first branch signal to become an imaginary part of a new complex signal which new complex signal becomes a first swapped signal, and wherein the conjugate swapper takes an imaginary part of the second branch signal to become a real part and a real part of the second branch signal to become an imaginary part of a second complex signal which second complex signal becomes a second swapped signal. A differencer determines a difference of the first swapped branch signal and the second swapped branch signal to produce a difference signal and a diversity combiner configured to combine the sum signal, the first branch signal, the second branch signal and the difference signal.

21 Claims, 6 Drawing Sheets

(56) References Cited

U.S. PATENT DOCUMENTS

| | | | |
|---|---|---|---|
| 2003/0022649 A1* | 1/2003 | Voyer | H04B 7/0848 455/277.1 |
| 2004/0104844 A1* | 6/2004 | Rooyen | H01Q 1/246 342/377 |
| 2007/0002962 A1* | 1/2007 | Trachewsky | H04L 1/0068 375/267 |
| 2007/0004364 A1* | 1/2007 | Linnartz | H04B 7/084 455/272 |
| 2007/0165758 A1* | 7/2007 | Robert | H04B 1/126 375/347 |
| 2008/0063103 A1 | 3/2008 | Lee et al. | |
| 2010/0190460 A1* | 7/2010 | Beaulieu | H04B 7/0857 455/278.1 |

* cited by examiner

RECEIVE DECORRELATOR FOR A WIRELESS COMMUNICATIONS SYSTEM

CROSS-REFERENCE TO RELATED APPLICATION

This application is the 35 U.S.C. § 371 national stage application of PCT Application No. PCT/IB2016/053818, filed Jun. 27, 2016, where the PCT claims priority to and the benefit of, GB Patent Application No. 1511369.9, filed Jun. 29, 2015, both of which are herein incorporated by reference in their entireties.

BACKGROUND OF THE INVENTION

This invention relates to decorrelation of signals in order to improve coding gains of wireless communications; and to a method and a computer program for implementing decorrelation and diversity. In principle, decorrelation in this invention also refers to synthesizing of virtual signals. Data decorrelation is vital in data compression techniques where information needs to be encoded with a few bits. Therefore, decorrelation can be used to reduce dynamic range of signals while bearing the same amount of information. Also, the decorrelated signals possess different signal properties that can be exploited to achieve coding gains in wireless communications. Decorrelation is known to refer to a form of signal processing implemented by software running on a computer system and accepting data from sensors after conversion from analogue to digital form. In this invention, a computer algorithm and apparatus is presented.

Both linearity and stationarity assumptions are used with the present invention. Linearity means that mixtures of signals received by sensors are linear combinations of these signals. Stationarity means that received signals and channels in which they mix remain the same over a sampling time interval for the mixed signals.

Several decorrelation algorithms referred to as instantaneous algorithms can be used to effect decorrelation. Normally, transforms that are energy preserving or not are used. The use of energy preserving transforms for decorrelation avoids information being destroyed and leads to output signals with other useful properties.

In the case that an arbitrary covariance matrix is computed, the problem of finding the decorrelator becomes the orthonormal eigenvector problem. The transformation resulting from the computation of eigenvalues from the covariance matrix is referred to as Karhunen-Loéve transform (KLT).

A method of principal components can also be used to remove signal correlations from discrete elements of a random variable. Several algorithms are known for eigenvalue problems as long as the covariance matrix is given. For example a simple Jacobi method can be used to obtain the eigenvectors of the KLT.

Other methods have recently been introduced that avoid the calculation of covariance matrices but update estimates for each input training vector.

These approaches show some weaknesses in terms of convergence and stability. Mainly, the complexity of computing the covariance matrix or the eigenvectors may need to be incurred in data compression applications, but may not be necessary in achieving coding gains for wireless communications.

In fact discrete Fourier transform (DFT) and fast Fourier transform (FFT) techniques can be used to implement blind decorrelators for wireless communications. However, the problem remains on how to reduce signal errors due to correlation because these transformations are unitary, energy preserving and reciprocal.

In fact, decorrelation results in a reduction in the geometric mean of the new signal variances (eigenvalues) thus improving the coding gain. As a result, if selection combining (SC) is used at the receiver, the signal with the largest variance will be selected leading to decorrelation gains thus, reduction in signal errors. However, even for SC, additional signal errors can be eliminated when the current invention is used.

When the decorrelated signals are combined via equal gain combining (EGG), it has been shown that the decorrelation gains are lost for some signals with high power. For maximal ratio combining (MRC), no additional gains are achieved.

Therefore, the current invention underscores how decorrelation gains can be achieved through blind decorrelation so that signal errors are always reduced for SC and EGC or any other combiner, MRC not being included. We note here that the combining operations for SC, EGC and MRC are known.

Besides, for simplicity of additive signal operations, the current invention does not borrow from DFT, FFT or any other blind decorrelators, but uses binary index transform (BiT). This leads to a simple signal processing algorithm which involves simple binary signal pairing.

It is further noted that blind unitary decorrelators like DFT and FFT may require some form of uniform circular arrays (UCA) and will lead to the less decorrelation gains even when the current invention is used. This is because DFT and FFT operations give almost similar output signals with limited differences. In addition, since eigenvectors developed from the KLT approaches are maximized in a particular direction, equal coding gains will be achieved compared to BiT when eigenvectors obtained from KLT approaches are used with the current invention.

An N branch decorrelator receiver is provided in which decorrelation is performed with a simple addition and subtraction. The decorrelation gains are achieved due to enhanced diversity from virtual antennas assumed to be in the antenna spacing. Virtual signals are the signals in the spacing between the real antennas which are synthesized by computing the principal components (eigenvalue-weighted) of signals in each pair of antennas.

In fact, based on the same, the same decorrelator receiver finds application in processing independent signals, uncorrelated signals and correlated signals to improve plurality of signals before diversity combining is performed.

The present invention seeks to provide an N-branch system consisting of N correlated signals with N uncorrelated signals so as to enhance simple analysis of the figures of merit of the correlated system. Secondly, the present invention seeks to provide additional N(N−1) decorrelated signals to the N correlated signals in order to achieve additional coding gains. Thirdly, the invention also seeks to provide decorrelation in a simple way in order to maintain low complexity at the receiver.

SUMMARY OF THE INVENTION

According to one broad aspect of the present invention there is provided a branch signal processor for selection, equal-gain and switched diversity comprising: a summer to determine a sum of a first branch signal and a second branch signal to produce a sum signal; a conjugate swapper to determine a conjugate swap of the first branch signal and a conjugate swap of the second branch signal to produce two swapped signals; and a differencer to determine a difference of the first swapped branch signal and the second swapped branch signal to produce a difference signal; and a diversity combiner configured to combine the sum signal and the difference signal.

In some embodiments, the first branch signal and the second branch signal are respective antenna samples, intermediate frequency signal samples, or base-band samples.

In some embodiments, the first branch signal and the second branch signal are respective continuous signals.

In some embodiments, the diversity combiner is configured to perform at least one of: a) selection combining (SC); a) equal-gain combining (EGC) and c) switch-and-stay combining (SSC).

In some embodiments, the summer comprises at least one of: a) an operational amplifier; and b) an antenna transformer.

In some embodiments, the differencer comprises at least one of: a) an operational amplifier; and b) an antenna transformer.

In some embodiments, the branch signal processor further comprises a plurality of decorrelators, respectively configured to decorrelate respective pairs of branch signals received from respective pairs of antennas, said first branch signal and said second branch signal being one such pair of branch signals.

In some embodiments, the branch signal processor further comprises a gain control element configured to apply a gain to at least one of: a) the first branch signal; and b) the second branch signal.

In some embodiments, the gain of the gain control element is selected to equalize power of the first branch signal and the second branch signal.

In some embodiments, the diversity combiner is configured to perform SC combining by: determining which one of the sum signal and the difference signal has a higher signal to noise ratio (SNR); and selecting the one of the sum signal and the difference signal that has the higher SNR for data detection.

In some embodiments, the diversity combiner is configured to perform SC combining on the basis of a signal-plus-noise criterion for the sum and the difference signals.

In some embodiments, the diversity combiner is configured to perform SC combining on the basis of a signal-to-interference-plus-noise criterion for the sum and the difference signals.

In some embodiments, the diversity combiner is configured to perform EGC combining by: determining the sum of the sum signal, received signals and the difference signal in order to improve signal to noise ratio (SNR); and using the sum for data detection.

In some embodiments, the diversity combiner is configured to perform EGC combining on the basis of a signal-plus-noise criterion for the sum, the received and the difference signals.

In some embodiments, the diversity combiner is configured to perform EGC combining on the basis of a signal-to-interference-plus-noise criterion for the sum, received and the difference signals.

In some embodiments, the diversity combiner is configured to perform SSC combining by: determining a current SNR for a currently selected one of the sum signal, the received signals and the difference signal; determining if the current SNR for the currently selected one of the sum signal, the received signals and the difference signal is above a threshold; maintaining the selection of the currently selected one of the sum signal, the received signals and the difference signal upon determining that the current SNR for the currently selected one of the sum signal, the received signals and the difference signal is above the threshold; and switching the selection to the other one of the sum signal, received signals and the difference signal upon determining that the current SNR for the currently selected one of the sum signal and the difference signal is below the threshold.

In some embodiments, the diversity combiner is further configured to select the threshold as a function of the current SNR.

In some embodiments, the diversity combiner is configured to perform SSC combining on the basis of a signal-plus-noise criterion for the sum and the difference signals.

In some embodiments, the diversity combiner is configured to perform SSC combining on the basis of a signal-to-interference-plus-noise criterion for the sum and the difference signals.

In some embodiments, a receiver is provided that comprises: the above-summarized branch signal processor; a first antenna, the first branch signal based upon a signal received by the first antenna; a second antenna, the second branch signal based upon a signal received by the second antenna.

According to another broad aspect of the present invention, there is provided a method comprising: obtaining a first branch signal and a second branch signal; determining a sum of the first branch signal and the second branch signal to produce a sum signal; and determining a conjugate swap of the first branch signal and a conjugate swap of the second branch signal to produce two swapped signals; and determining a difference of the first branch swapped signal and the second branch swapped signal to produce a difference signal; and performing a diversity combining operation upon the sum signal, received and the difference signal.

In some embodiments, obtaining a first branch signal and a second branch signal comprises determining the first branch signal from a signal received through a first antenna and determining the second branch signal from a signal received through a second antenna.

In some embodiments, performing a diversity combining operation comprises performing selection combining (SC).

In some embodiments, performing a diversity combining operation comprises performing equal-gain combining (EGC).

In some embodiments, performing a diversity combining operation comprises performing switch-and-stay combining (SSC).

In some embodiments, a method performing gain control on at least one of the first branch signal and the second branch signal.

In some embodiments, performing gain control on at least one of the first branch signal and the second branch signal is performed to equalize power of the first branch signal and the second branch signal.

In some embodiments, the method further comprises selecting the threshold as a function of a current SNR.

In some embodiments, the method of further comprises: performing a respective sum operation on each of a plurality of pairs of branch signals to produce a respective sum signal, one of the pairs of branch signals consisting of the first branch signal and the second branch signal; and performing a conjugate swap of the first branch signal and a conjugate swap of the second branch signal to produce two swapped signals; performing a respective difference operation on each of the plurality of branch signals to produce a respective difference signal; performing a combining operation based on the sum signals, the received signals and the difference signals. According to another broad aspect of the present invention, there is provided a method comprising: obtaining a plurality N of branch signals, where N>=2; carrying out processing by multiplying the signal pairs by the binary index transform to give N(N−1) decorrelated outputs; and determining N(N−1) outputs each of which is a respective combination of the N inputs with a different permutations of signs; and obtaining a total of $N^2$ output signals among which N signals are also the input signals; and performing a diversity combining operation upon the $N^2$ outputs to produce a combiner output.

DESCRIPTION OF EMBODIMENTS

Figure 1:
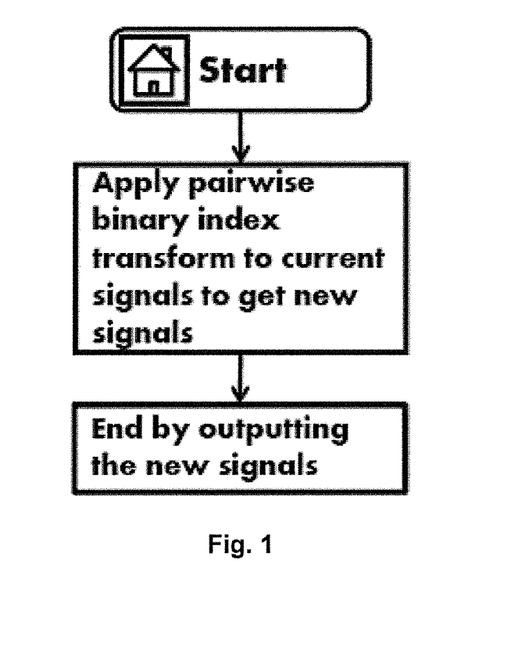
FIG. 1 is a flow diagram illustrating a simple process in which the present invention may be implemented.

Referring to FIG. 1 of the accompanying drawings, an example receive decorrelator for a wireless communications system is shown.

The system described is referred to as a blind decorrelator because the eigenvalues and the associated eigenvectors or a correlation matrix do not need to be computed in order to effect decorrelation.

Figure 2:
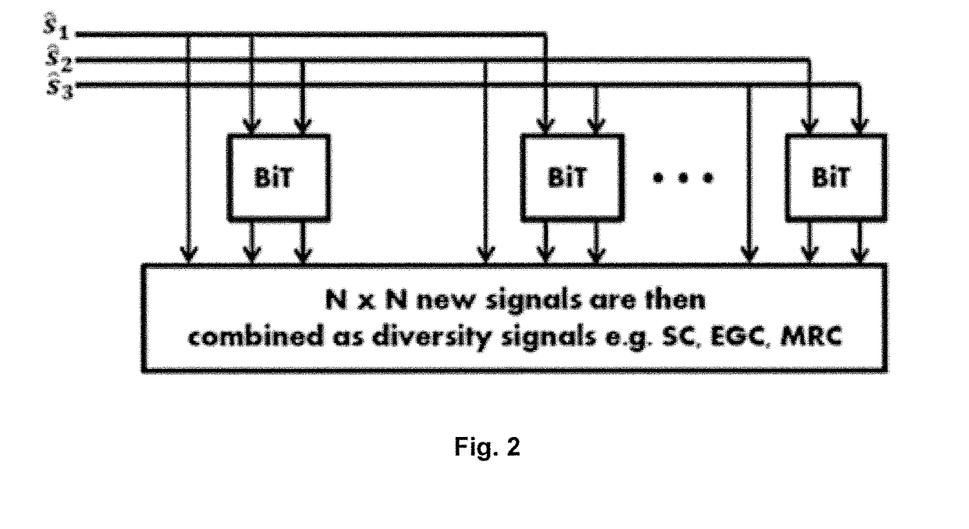
FIG. 2 is a block diagram illustrating an example system in which the present invention may be implemented for all BiTs.

In FIG. 2, N×1 branch signals for example $\hat{s}_1$, $\hat{s}_2$ and $\hat{s}_3$ are simply decorrelated through BiT into the multiple uncorrelated output signals $\hat{s}_{1i}$, $\hat{s}_{2i}$ and $\hat{s}_{3i}$ from the ith BiT. It consists of $$\frac{N(N-1)}{2} + 1$$

replicas of the received signals and BiT operations plus 1 replica of signals sent directly to the output.

Figure 3:
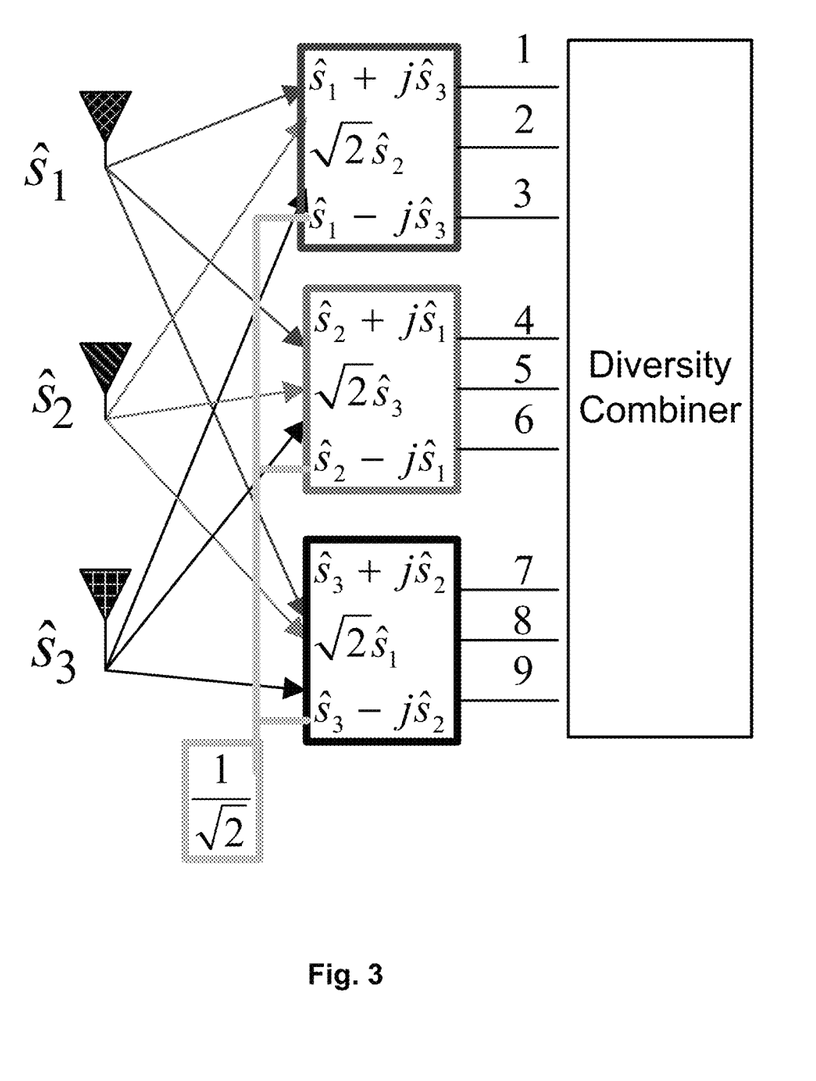
FIG. 3 is a block diagram illustrating an example system in which the present invention may be implemented as an N branch BiT for three branches.

In FIG. 3, N×1 branch signals for example $\hat{s}_1$, $\hat{s}_2$ and $\hat{s}_3$ are simply decorrelated through enhanced 3-BiT into the multiple decorrelated output signals $\hat{\hat{s}}_{1i}$, $\hat{\hat{s}}_{2i}$ and $\hat{\hat{s}}_{3i}$ from the ith BiT resulting in N×N outputs.

Figure 5:
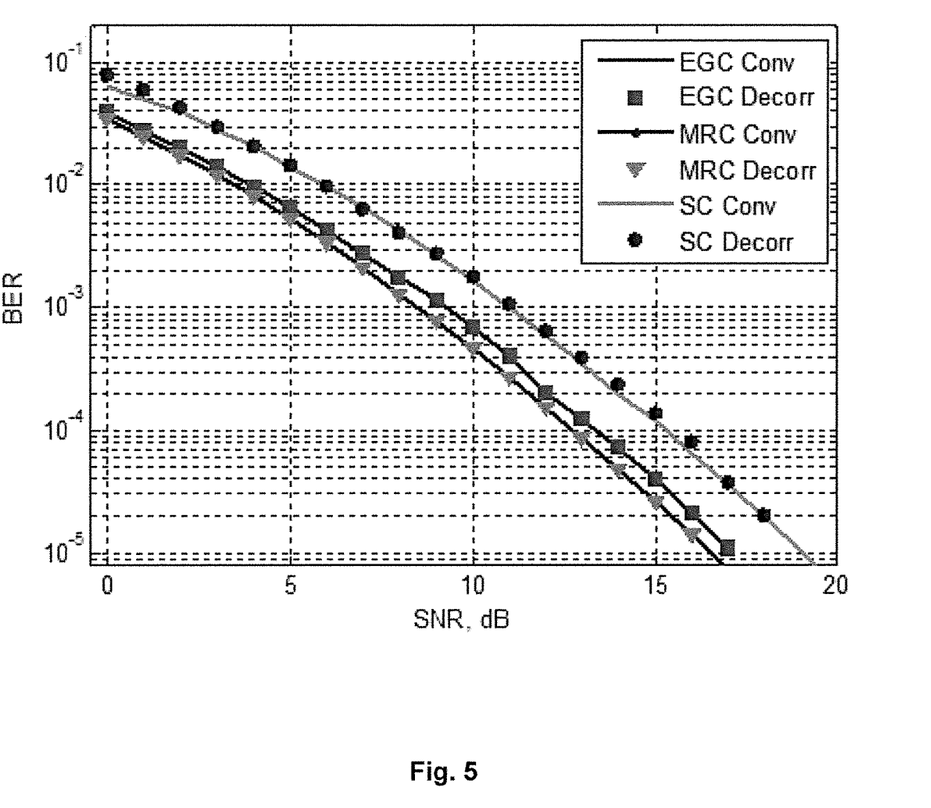
FIG. 5 BER for SC, EGC and MRC with BPSK, N=3 when single decorrelator is employed FIG. 6 Receive decorrelator BER for SC with BPSK, N=3

FIG. 5 illustrates the BER for selection combining (SC), equal-gain combining (EGC) and maximal ratio combining (MRC) schemes. It is seen that equal BER rate is obtained when the decorrelator system (Decorr) is compared with the conventional correlated system (Conv) without any correlation gains. There are no gains because only one BiT operation is performed. This means that performance analysis for correlated systems can be expressed in terms of the uniform principal decorrelator. The decorrelator presents uncorrelated signals which may then be analyzed in the several ways which are available in literature.

Figure 6:
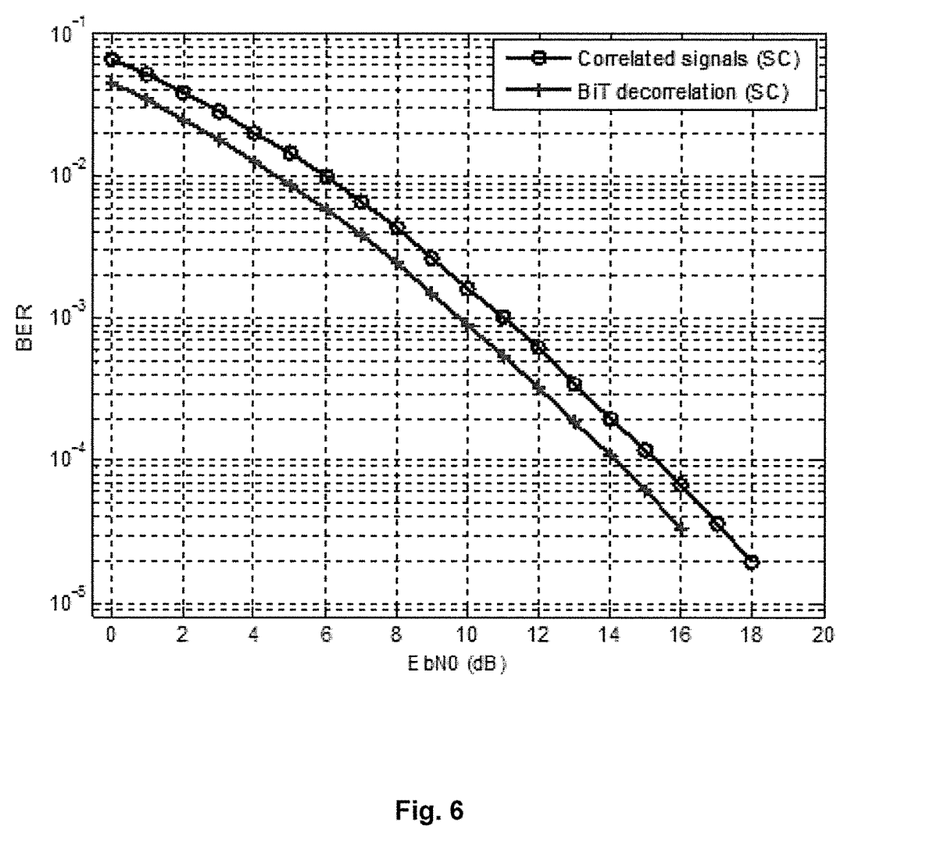

FIG. 6 shows the BER for SC with the decorrelator. We also note that decorrelation gains are achieved by the decorrelator due to the additional diversity branches at the receiver when all the BiT operations are performed. There is about 1 dB gain over the correlated case.

Figure 7:
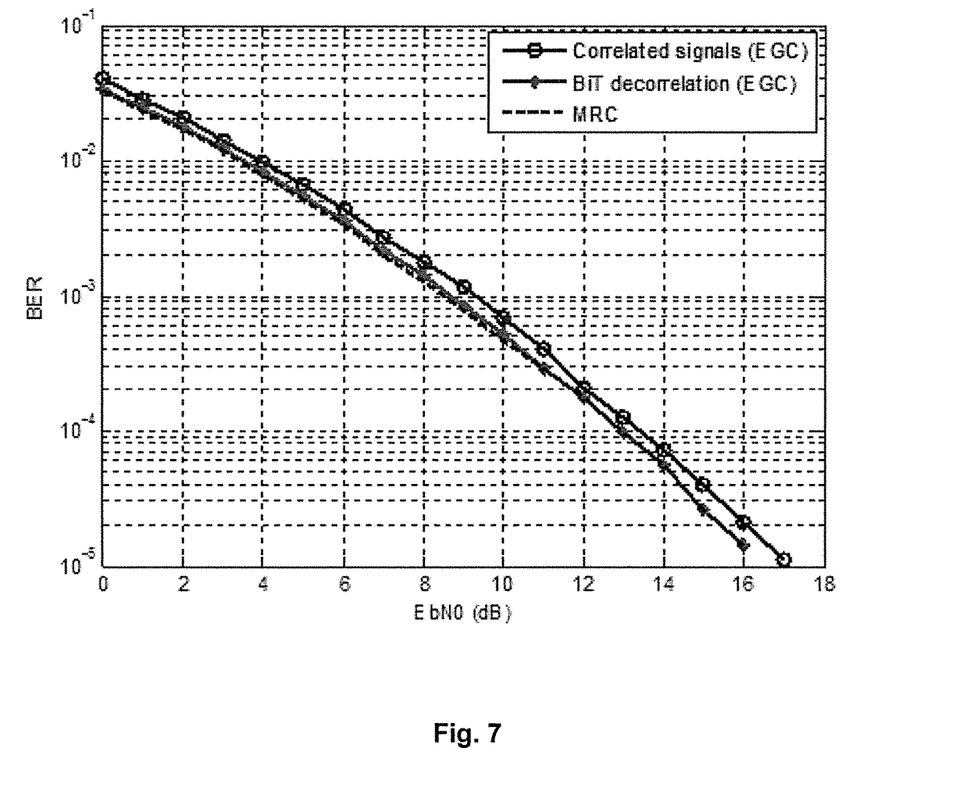
FIG. 7 Receive decorrelator BER for EGC with BPSK, N=3

FIG. 7 shows the BER for EGC when the decorrelator is used. Decorrelation gains are achieved by the decorrelator due to the additional diversity branches. Moreover, it is noted that the BER for EGC is equal to that of MRC. This may be attributed to the fact that the virtual antennas from the BiT outputs provide maximum likelihood estimation for all the instantaneous signals in the surrounding of the antennas. These components are normally captured through MRC detection but not EGC because the EGC detector assumes the knowledge of a pre-determined channel phase only.

In fact, MRC was also examined in [6], which shows identical performance for the decorrelator receiver and the conventional receiver with MRC.

The method of processor and method of the BiT to transform input signals is described as follows.

The method may involve N input signals where N is an integer equal to or greater than two.

(a) The method involves producing $$\frac{N(N-1)}{2} + 1$$

replicas of the set of input signals and
(b) In each replica, selecting a respective signal pair differing to that selected in other replicas and
(c) carrying out processing by multiplying the signal pairs by the binary index transform to give N(N−1) decorrelated outputs and
(d) obtaining a total of $N^2$ output signals among which N signals are also the input signals.

The decorrelation operation is illustrated for three signals in FIG. 2 where by coincidence of $$\frac{N(N-1)}{2},$$

three BiT transform operations are carried out for three different pairs of signals. In the example of FIG. 2, the six decorrelated outputs are arranged together with the three input signals to form $N^2$ output signals.

As an example, the operation of the ith BiT on the input signal bi-vector $\hat{S}_i$ to obtain two output signals $\hat{S}_o$ is expressed as follows $$\hat{S}_o = Q^H \hat{S}_i \quad (1)$$

where $$BiT = Q^H = \frac{1}{\sqrt{2}} \begin{pmatrix} 1 & 1 \\ -j & j \end{pmatrix}$$

The BiT involves a method of:
1) obtaining a first branch signal and a second branch signal;
2) determining a sum of the first branch signal and the second branch signal to produce a sum signal;

3) determining a conjugate swap of the first branch signal and a conjugate swap of the second branch signal to produce two swapped signals; and
4) determining a difference of the first swapped branch signal and the second swapped branch signal to produce a difference signal; and
5) using a gain control element configured to apply a gain to at least one of:
   a) the first branch signal; and
   b) the second branch signal.
wherein the gain of the gain control element is selected to equalize power of the first branch signal and the second branch signal.

Figure 4:
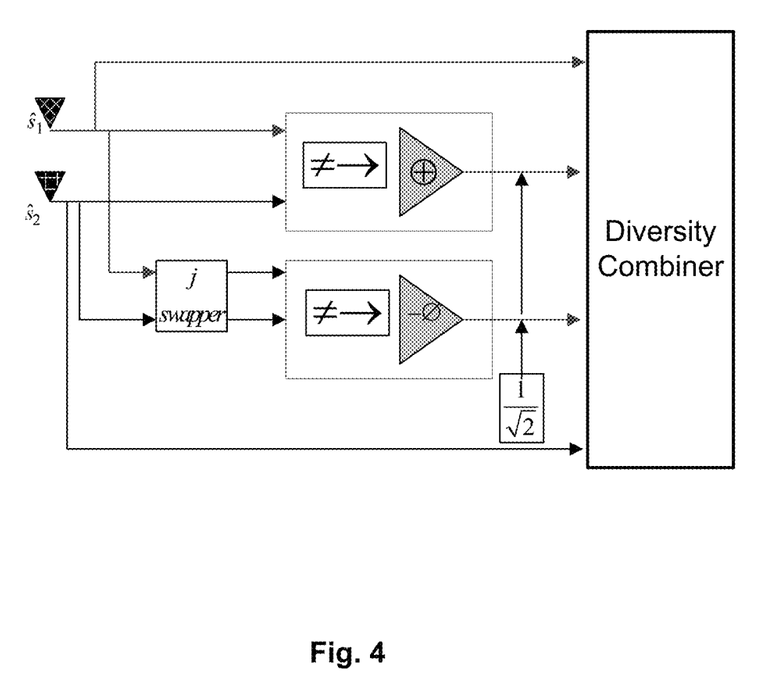
FIG. 4 is a block diagram illustrating an example system in which the BiT operation of the present invention may be implemented.

The operation of the BiT is illustrated in FIG. 4. In FIG. 4, the input 1 is added to the input 2 to give one of the BiT outputs. The adder (⊕) is composed of a conventional circuit of an antenna transformer (≠→) and an operational amplifier (triangle). The differencer inputs are taken from the outputs of a conjugate swapper (j swapper). The swapper takes the imaginary part of the first signal to become the real part and the real part to be the imaginary part of a new first swapped signal. In addition, the swapper takes the imaginary part of the second signal to become the negative real part and the real part to be the imaginary part of a new second swapped signal. The differencer (–∅) then subtracts the first new swapped signal from the new second swapped signal. The differencer is composed of a conventional circuit of a transformer (≠→) and an amplifier (triangle).

The outputs of the summer and the differencer are then combined by a diversity combiner, particularly wherein the outputs of the summer and the differencer are averaged by the gain controller of $$\frac{1}{\sqrt{2}}$$

after which they become the decorrelated outputs of the BiT. The swap operation is further illustrated in equation (A3).

The diversity combiner may be configured to perform selection combining (SC) by determining which one of the sum signal, the received signals and the difference signal has a higher signal to noise ratio (SNR); and then selecting the one of the sum signal, the received signals and the difference signal that has the higher SNR for data detection.

The diversity combiner is configured to perform SC combining on the basis of a signal-plus-noise criterion for the sum, the received and the difference signals.

Alternatively or in addition, the diversity combiner is configured to perform equal gain combining (EGC) combining by summing the sum signal, the received signals and the difference signal to improve the signal to noise ratio (SNR)

In this example, the diversity combiner is configured to perform EGC combining on the basis of a signal-plus-noise criterion for the sum, the received and the difference signals.

Alternatively or in addition, the diversity combiner is configured to perform EGC combining on the basis of a signal-to-interference-plus-noise criterion for the sum, received and the difference signals.

The diversity combiner may be configured to perform switch-and-stay combining (SSC) combining by determining a current SNR for a currently selected one of the sum signal, received signal and the difference signal.

Determining if the current SNR for the currently selected one of the sum signal, received signal and the difference signal is above a threshold.

Maintaining the selection of the currently selected one of the sum signal, received and the difference signal upon determining that the current SNR for the currently selected one of the sum signal, received and the difference signal is above the threshold and switching the selection to the other one of the sum signal, received and the difference signal upon determining that the current SNR for the currently selected one of the sum signal, received and the difference signal is below the threshold.

The diversity combiner is further configured to select the threshold as a function of the current SNR.

The diversity combiner may also be configured to perform SSC combining on the basis of a signal-plus-noise criterion for the sum, received and the difference signals.

Alternatively or in addition, the diversity combiner is configured to perform SSC combining on the basis of a signal-to-interference-plus-noise criterion for the sum, received and the difference signals.

In another aspect, the current invention provides a computer apparatus being programmed for reception of N input signals characterised in that the apparatus is also programmed to transform input signals into output signals.

Classical Decorrelation and Receive Diversity

In the conventional scheme, correlated signal received from the ith antenna branch is written as $$\hat{s}_i = \hat{h}_i x_\varphi + n_i, i=1, \ldots, N \quad (1)$$

where $x, \varphi \in X$ is the transmitted signal with $E[|x_\varphi|^2]=1$ and $E[\cdot]$ denotes the expectation operator. $\hat{h}_i$ is the correlated complex channel gain for the ith branch and $n_i$ is the complex Gaussian noise with the distribution $\mathcal{CN}(0, N_0)$.

Let $\hat{z} = \hat{h}x$, then the correlation matrix of the vector z is Hermitian and is given as $$R = E[\hat{z}\hat{z}^H] \quad (2)$$

where $\{\cdot\}^H$ denotes the conjugate transpose.

Thus the channel correlation is modeled by a positive definite correlation matrix R which ensures that all the eigenvalues $\{\in_i\}_1^N$ of R are real and R has a complete set of orthonormal eigenvectors $\{q_i\}_1^N$. Therefore, the correlation matrix R is unitarily diagonalizable. Since Q is unitary and row-orthogonal, the diagonalization of R is achieved as follows $$R = E[Q\Lambda Q^H] \quad (2)$$

where $\Lambda = \mathrm{diag}(\in_1 \in_2 \ldots \in_N)$.

The condition that $RQ=QD$ and $Q^{-1}=Q^H$ means that the network is reciprocal and the condition that $Q^HQ=QQ^H=I$ where I is the identity matrix, means that the network is lossless or energy preserving [11]. Intuitively, Q bears information on how correlated branch signal pairs are linearly transformed into independent ones at the receiver while Λ measures the redistributed branch signal strengths.

To perform decorrelation, the decorrelator applies a unitary transformation on the received signals g such that the new set of signals is given as $\hat{\hat{s}} = Q^H \hat{s}$. This operation results in a sum of uncorrelated signals which is given as $$\hat{\hat{s}} = Q^H h x_\varphi + Q^H n \quad (3)$$

Clearly, the correlation matrix $\hat{R}$ of the transformed signals is the set of eigenvalues Λ and the noise remains independent of the signals. The significance of (3) is that a correlated channel $\hat{a}_i$ can then be expressed in terms of the independent channel $\hat{a}_i$ given that the unit direction vectors q of $\hat{R}$ are known. As a consequence, the correlated channels are expressed as $$\hat{a}_i = \sqrt{\varepsilon_i} q_i \hat{a}_i = A_i \hat{a}_i \qquad (4)$$

where for Rayleigh fading, $\hat{a}_i$ is the complex channel gain with a Rayleigh distributed random amplitude of the form $\mathcal{CN}(0,1)$ and a uniformly distributed random phase.

Since the operation of $Q^H$ through classical methods tend to maximize the first eigenvalue, the output branches of the conventional decorrelator will contain unique branch signal powers when compared to its input. However, the overall signal power is retained i.e. the eigenvalues of $\hat{R}$ and $R$ are the same. Therefore, depending on the method used to combine the signals after the decorrelator, the performance of the combiners will be different.

Typically for three branches, MRC, EGC, and SC system combining functions for the signal power can be summarized as $$F_{MRC}(\hat{s}) = F(\hat{s}*\hat{s})$$

$$F_{EGC}(\hat{s}) = \tfrac{1}{3}(|\hat{s}_1| + |\hat{s}_2| + |\hat{s}_3|)^2$$

$$F_{SC}(\hat{s}) = \max[(|\hat{s}_1|^2, |\hat{s}_2|^2, |\hat{s}_3|^2] \qquad (5)$$

where (*) denotes the complex transpose conjugate operation.

From (5), it can be seen that only $F_{MRC}$ will remain the same after decorrelation. In fact, it is easy to see that due to the redistribution of signal powers, the SC combiner will achieve decorrelation gains because the maximum output may always be more than that of single channel.

Practically, the matrix R can be computed at the receiver. However, these signal measurements can be very complex and thus time consuming. Nonetheless, the knowledge of eigenvectors alone can be used to carry out blind channel decomposition into uncorrelated ones without estimating the covariance as long as the eigenvector corresponds to the principal value of a given network. For example, for uniform circular arrays (UCA), the eigenvalues are given by the discrete Fourier transform (DFT) of the first row of R where the unitary transformation is given as $$Q = \frac{1}{\sqrt{N}} \begin{bmatrix} 1 & 1 & \cdots & 1 \\ 1 & \alpha^1 & \cdots & \alpha^{N-1} \\ \vdots & \vdots & \ddots & \vdots \\ 1 & \alpha^{N-1} & \cdots & \alpha^{(N-1)(N-1)} \end{bmatrix} \qquad (6)$$

where $\alpha = e^{-j2\pi/N}$.

By inspection, the unitary transformation Q, is essentially an orthogonal beam-forming matrix. Therefore, the problem reduces to determining a basic decorrelator for arbitrary correlation. The decorrelator should be blind to the type of correlation and applicable in multi branch signals.

Firstly, for the decorrelator to achieve uniform decorrelation so that (5) is not changed, then the use of the new decorrelator leads to a scenario where $\Lambda \neq \text{diag}(\varepsilon_1, \varepsilon_2 \ldots \varepsilon_N)$. Secondly, the eigenvalues must not be repeated since that will make EGC perform just like MRC. These conditions seem to make no sense because no decorrelation gains are achieved, but in terms of performance analysis, a correlated system can then be described by a decorrelated system if these conditions are met.

Besides, decorrelation gain is a very important aim in decorrelation processes. We will show that through principal component analysis (PCA), an eigenvector can be designed that achieves both uniform decorrelation and decorrelation gain when connected in a proposed network. This is the main discovery in the proposed approach. Accordingly, Q which meets the above criteria is presented. This is referred to as binary index transform (BiT) decorrelator.

Mathematical Validation

In the following description, it is shown that the operation carried by each BiT transform results in decorrelated output signals. Let $x_i$ and $x_j$ be zero-mean random variables (RVs). Taking the expectation of the product of the two RVs results is the covariance and the signals will be decorrelated if the covariance is zero for $i \neq j$ i.e., $$E(x_i x_j) = \begin{cases} 0 & i \neq j \\ \sigma_i^2 & i = j \end{cases} \qquad (A1)$$

where $E(\cdot)$ is the expectation operator and $\sigma_i^2$ is the variance.

Transformed Signal Analysis

Let $\rho_m$ and $\rho$ denote the mixing coefficient and correlation coefficients, respectively between any two mixed signals and $\sigma^2$ to denote the variance of each channel. Then, the analytical deductions of the output signals $\hat{s}_{o1}$ and $\hat{s}_{o2}$ and the covariance within each output signal can be expressed in the following analysis.

The output of each BiT operation is written as follows: $\hat{S}_o = Q^H \hat{S}_i$, where $(\cdot)^H$ denotes the Hermitian transpose of the BiT eigenvector Q where it is given that $$Q = \frac{1}{\sqrt{2}} \begin{pmatrix} 1 & j \\ 1 & -j \end{pmatrix} = \begin{pmatrix} \cos\theta & j\cos\theta \\ \sin\theta & -j\sin\theta \end{pmatrix}$$

for $\theta = 45°$.

$$\hat{s}_{o1} = \cos\theta(X_1 + jY_1)s + \cos\theta(X_2 + jY_2)s + \cos\theta \cdot n_1 + \cos\theta \cdot n_2 = \qquad (A2)$$
$$\{\cos\theta(X_1 + jY_1)s + [\cos\theta(X_2 + jY_2)s]\}s + \cos\theta \cdot n_1 + \cos\theta \cdot n_2 =$$
$$\left\{\underbrace{[\cos\theta(X_1 + X_2)]}_{X_3} + j\underbrace{[\cos\theta(Y_1 + Y_2)]}_{Y_3}\right\}s + \underbrace{\cos\theta \cdot n_1 + \cos\theta \cdot n_2}_{n_3}$$

$$\hat{s}_{o2} = \qquad (A3)$$
$$-j\sin\theta(X_1 + jY_1)s + j\sin\theta(X_2 + jY_2)s - j\sin\theta \cdot n_1 + j\sin\theta \cdot n_2 =$$
$$\{-\sin\theta(X_1 + jY_1) + j[\sin\theta(X_2 + jY_2)]\}s - \sin\theta \cdot n_1 + j\sin\theta \cdot n_2 =$$
$$\left\{\underbrace{[\sin\theta(Y_1 - Y_2)]}_{X_4} + j\underbrace{[\sin\theta(X_2 - X_1)]}_{Y_4}\right\}s + \underbrace{\sin\theta \cdot n_2 - j\sin\theta \cdot n_1}_{n_4}$$

Since $X_1, X_2, Y_1$ and $Y_2$ are zero mean Gaussian random variables, it is clear that $X_3, X_4, Y_3$ and $Y_4$ are also zero mean Gaussian random variables. Now we calculate variances of $X_3, X_4, Y_3$ and $Y_4$ $$E[X_3^2] = E[(\cos\theta(X_1 + X_2))^2] = \cos^2(\theta)E[X_1^2 + X_2^2 + 2X_1X_2]$$

$$\Downarrow E[X_1^2] = E[Y_1^2] = \sigma^2, E[X_1X_2] = \rho\rho_m\sigma^2$$

$$E[X_3^2] = (1 + \rho\rho_m)\sigma^2 = \sigma_3^2 \qquad (A4)$$

$E[X_4^2]=E[(\sin\theta(Y_1-Y_2))^2]=\sin^2(\theta)E[Y_1^2+Y_2^2-2Y_1Y_2]$ $\Downarrow E[X_1^2]=E[Y_2^2]=\sigma^2, E[Y_1Y_2]=\rho\rho_m\sigma^2$ $E[X_4^2]=(1-\rho\rho_m)\sigma^2=\sigma_4^2$ (A5)

$E[Y_3^2]=E[(\cos\theta(Y_1+Y_2))^2]=\cos^2(\theta)E[Y_1^2+Y_2^2+2Y_1Y_2]$ $\Downarrow E[Y_1^2]=E[Y_2^2]=\sigma^2, E[Y_1Y_2]=\rho\rho_m\sigma^2$ $E[Y_3^2]=(1+\rho\rho_m)\sigma^2=\sigma_3^2$ (A6)

$E[Y_4^2]=E[(\sin\theta(X_1-X_2))^2]=\sin^2(\theta)E[X_1^2+X_2^2-2X_1X_2]$ $\Downarrow E[Y_1^2]=E[X_2^2]=\sigma^2, E[X_1X_2]=\rho\rho_m\sigma^2$ $E[Y_4^2]=(1-\rho\rho_m)\sigma^2=\sigma_4^2$ (A7)

We note that $E[X_iY_k]=0$, $i=1, 2$ and $k=1, 2$ and the covariances of $X_3$ and $X_4$ can be calculated by $$C_{X_3 X_4} = E[X_3 X_4] = \cos\theta(X_1+X_2)\sin\theta(Y_1-Y_2) =$$
$$E\{\cos\theta\sin\theta[(X_1Y_2-X_2Y_2+X_1Y_1-X_2Y_1)]\}=0$$ (A8)

Similarly, the covariances of $Y_3$ and $Y_4$ can be calculated by $$C_{Y_3 Y_4} = E[Y_3 Y_4] = \cos\theta(Y_1+Y_2)\sin\theta(X_2-X_1) =$$
$$E\{\cos\theta\sin\theta[(Y_1X_2-Y_1X_1+Y_2X_2-Y_2X_1)]\}=0$$ (A9)

Readily, in view of (A1), the transformation results in decorrelation.

Let the new random variables be expressed as $\alpha_k e^{j\theta_k}=X_k+jY_k, k=o1, o2, o3$ and $\alpha_k=\sqrt{X_k^2+Y_k^2}$ which are the envelopes of two independent Rayleigh-fading signals. We therefore have $E[\alpha_{o1}^2]=2(1+\rho\rho_m)\sigma^2$ and $E[\alpha_{o2}^2]=2(1-\rho\rho_m)\sigma^2$ while $E[\alpha_{o3}^2]=1$. We also have $[|n_k|^2]=N_0$, $k=o1, o2, o3$. The average SNR for $\hat{s}_{o1}$ and $\hat{s}_{o2}$ are $\bar{\gamma}_{o1}=(1+\rho\rho_m)\bar{\gamma}$ and $\bar{\gamma}_{o2}=(1-\rho\rho_m)\bar{\gamma}$ respectively, where $\bar{\gamma}$ is the average SNR for $\hat{s}_1, \hat{s}_2$ and $\hat{s}_3$.

Clearly, $\hat{s}_{o1}$ and $\hat{s}_{o2}$ are two independent Rayleigh-fading signals. Furthermore, as explained in the text, the values $D_{o1}=(1+\rho\rho_m)$, $D_{o2}=(1-\rho\rho_m)$ and $D_{o3}=1$ are the principal component scaling values or eigenvalues where we have $\rho\rho_m=\rho$ since $\rho_m=1$.

The discovery of the invention is that $\rho$ varies for each set of a pair of signals and instead of exploiting the set or operations which maximize $D_{oi}$, the decorrelated signals from each set can be used to achieve coding gains. The basis of the invention is novel and informs the teachings of the current invention in that it is the 'virtual signals' in the spacing between the real antennas that are computed by the BiT so that a full N×N channel and N×N output signal matrix can be formed by the decorrelated signals when these decorrelated signals are added to the signals received by the real antennas.

In summary, obtaining converged eigenvectors to achieve this task involves computation of the covariance matrix and the computation of corresponding eigenvectors as in the KLT algorithms. The use of blind eigenvectors like the BiT avoids this complexity overhead. Furthermore, not all blind eigenvectors e.g. N branch DFT can achieve this task like the BiT. Furthermore, the BiT can be enhanced to be an N branch N-BiT in order to perform less operations. This can be done by designing an N-branch unitary row-orthogonal matrix with orthonormal basis. However, even when the BiT is enhanced, the same gains are achieved.

Method of Simulations

The simulations illustrated in the figures are for the bit error probability/rate (BER). System BER is carried out for the three receive diversity combining systems. Each three-branch diversity system BER is presented against the output SNR. Signals modulated via binary phase shift (BPSK) technique are used in the simulations.

In the succeeding discussion, the output SNR of the BiT decorrelator is used to show that the BER remains the same as the conventional case. In order to compute correlation R, a linear array of antennas is assumed with uniform angle of arrival (AOA). It is known that correlation coefficients can be obtained from the formula $$\rho = J_0\left(2\pi\frac{d}{\lambda}\right)$$ (A10)

where $J_0(\cdot)$ is the zero-order Bessel function of the first kind, d is the spacing between antennas and $\lambda$ is the wavelength of the carrier.

For example, given an antenna spacing of $d=0.2\lambda$, then normalized correlation matrices with correlation coefficients $\rho$ for three equally-spaced receive branches is written as $$R = \begin{pmatrix} 1 & 0.6425 & -0.055 \\ 0.6425 & 1 & 0.6425 \\ -0.055 & 0.6425 & 1 \end{pmatrix}$$ (A11)

Thus it will be appreciated that the present invention provides an improved decorrelator and a method for receiving and decorrelating signals in a wireless communications system. Furthermore, all diversity combiners normally used in wireless communications can be applied on the output signals provided by the present invention.

The invention claimed is:

1. A branch signal processor including:
   a summer to determine a sum of a received first branch signal and a received second branch signal to produce a sum signal;
   a conjugate swapper to determine a conjugate swap of the first branch signal and a conjugate swap of the second branch signal to produce two swapped signals, wherein the conjugate swapper takes an imaginary part of the first branch signal to become a real part and a real part of the first branch signal to become an imaginary part of a new complex signal which new complex signal becomes a first swapped signal, and wherein the conjugate swapper takes an imaginary part of the second branch signal to become a real part and a real part of the second branch signal to become an imaginary part of a second complex signal which second complex signal becomes a second swapped signal;
   a differencer to determine a difference of the first swapped signal and the second swapped signal to produce a difference signal; and
   a diversity combiner configured to combine the sum signal, the first branch signal, the second branch signal, and the difference signal.

2. The branch signal processor of claim 1, wherein the first branch signal and the second branch signal are respective antenna samples, intermediate frequency signal samples, or base-band samples.

3. The branch signal processor of claim 1, wherein the first branch signal and the second branch signal are respective continuous signals.

4. The branch signal processor of claim 1, wherein the diversity combiner is configured to perform at least one of:
   a) selection combining (SC);
   b) equal-gain combining; and
   c) switch-and-stay combining (SSC).

5. The branch signal processor of claim 4, wherein the diversity combiner is configured to perform selection combining (SC) by:
   determining which one of the sum signal, the first branch signal, the second branch signal, and the difference signal has a higher signal to noise ratio (SNR); and
   selecting the one of the sum signal, the first branch signal, the second branch signal, and the difference signal that has the higher SNR for data detection.

6. The branch signal processor of claim 4, wherein the diversity combiner is configured to perform SC on a basis of a signal-plus-noise criterion for the sum signal, the first branch signal, the second branch signal, and the difference signal.

7. The branch signal processor of claim 4, wherein the diversity combiner is configured to perform SC on a basis of a signal-to-interference-plus-noise criterion for the sum signal, first branch signal, the second branch signal, and the difference signal.

8. The branch signal processor of claim 4, wherein the diversity combiner is configured to perform equal gain combining (EGC) by averaging by summing the sum signal, the first branch signal, the second branch signal, and the difference signal to improve the signal to noise ratio (SNR).

9. The branch signal processor of claim 4, wherein the diversity combiner is configured to perform EGC on a basis of a signal-plus-noise criterion for the sum signal, the first branch signal, the second branch signal, and the difference signal.

10. The branch signal processor of claim 4, wherein the diversity combiner is configured to perform EGC on a basis of a signal-to-interference-plus-noise criterion for the sum signal, first branch signal, the second branch signal, and the difference signal.

11. The branch signal processor of claim 4, wherein the diversity combiner is configured to perform switch-and-stay combining (SSC) by:
   determining a current SNR for a currently selected one of the sum signal, the first branch signal, the second branch signal, and the difference signal;
   determining if the current SNR for the currently selected one is above a threshold;
   in response to determining that the current SNR is above the threshold, maintaining a selection of the currently selected one; and
   in response to determining that the current SNR is not above the threshold, switching the selection to another one of the sum signal, the first branch signal, the second branch signal, and the difference signal.

12. The branch signal processor of claim 1, wherein the summer comprises at least one of:
   a) an operational amplifier; and
   b) an antenna transformer.

13. The branch signal processor of claim 1, wherein the differencer comprises at least one of:
   a) an operational amplifier; and
   b) an antenna transformer.

14. The branch signal processor of claim 1, further comprising a gain control element configured to apply a gain to at least one of:
   a) the first branch signal; and
   b) the second branch signal,
   wherein the gain of the gain control element is selected to equalize power of the first branch signal and the second branch signal.

15. A receiver comprising:
   the branch signal processor of claim 1;
   a first antenna, the first branch signal based upon a signal received by the first antenna; and
   a second antenna, the second branch signal based upon a signal received by the second antenna.

16. A method comprising:
   obtaining a received first branch signal and a received second branch signal;
   determining a sum of the first branch signal and the second branch signal to produce a sum signal;
   determine a conjugate swap of the first branch signal and a conjugate swap of the second branch signal to produce two swapped signals, wherein an imaginary part of the first branch signal becomes a real part and a real part of the first branch signal becomes an imaginary part of a new complex signal which new complex signal becomes a first swapped signal, and wherein an imaginary part of the second branch signal becomes a real part and a real part of the second branch signal becomes an imaginary part of a second complex signal which second complex signal becomes a second swapped signal;
   determining a difference of the first swapped signal and the second swapped signal to produce a difference signal; and
   performing a diversity combining operation upon the sum signal, the first branch signal, the second branch signal and the difference signal.

17. The method of claim 16, wherein obtaining the first branch signal and the second branch signal comprises determining the first branch signal from a signal received through a first antenna and determining the second branch signal from a signal received through a second antenna.

18. The method of claim 17, wherein performing the diversity combining operation comprises performing selection combining.

19. The method of claim 16, wherein performing the diversity combining operation comprises performing switch-and-stay combining (SSC).

20. The method of claim 16, further comprising performing gain control on at least one of the first branch signal and the second branch signal to equalize power of the first branch signal and the second branch signal.

21. The method of claim 16, further comprising:
   performing a respective sum operation on each of a plurality of pairs of branch signals to produce a respective sum signal, one of the pairs of branch signals consisting of the first branch signal and the second branch signal;
   performing a respective difference operation on each of the plurality of swapped branch signals to produce a respective difference signal; and
   performing a combining operation based on the sum signals, the pairs of branch signals, and the difference signals.

* * * * *